UNITED STATES PATENT OFFICE.

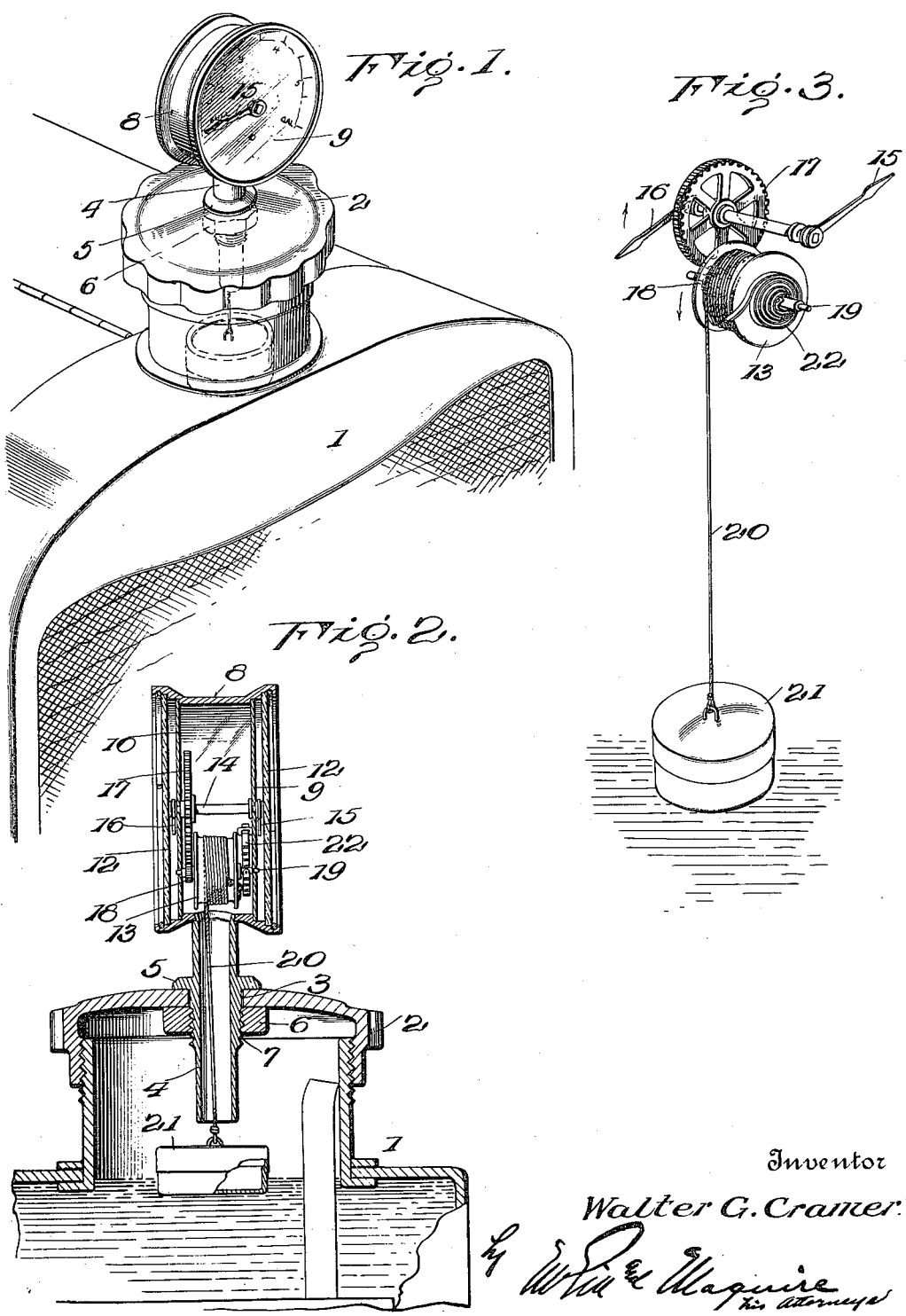

WALTER G. CRAMER, OF CINCINNATI, OHIO.

INDICATOR FOR AUTOMOBILE-RADIATORS.

1,279,277.              Specification of Letters Patent.     Patented Sept. 17, 1918.

Application filed April 30, 1918. Serial No. 231,690.

*To all whom it may concern:*

Be it known that I, WALTER G. CRAMER, of Cincinnati, in the county of Hamilton and State of Ohio, have invented certain new and useful Improvements in Indicators for Automobile-Radiators; and I do hereby declare the following to be a full, clear, and exact description of the invention, such as will enable others skilled in the art to which it appertains to make and use the same.

My invention relates to devices adapted to be attached to tanks for indicating the quantity of fluid in the tank. The object of my invention is to provide a simple and highly efficient device which is particularly adapted for use in connection with radiators of automobiles to show whether or not it is necessary to add additional water, the device being formed of a minimum number of parts so assembled as to not readily get out of order.

In the drawings, Figure 1 shows in perspective a portion of an automobile radiator with my device attached thereto. Fig. 2 is a vertical sectional view. Fig. 3 is a perspective of the mechanism of my indicator.

At 1 I have shown an automobile radiator of conventional form provided with the usual opening through which water is supplied and which opening is closed by a cap 2. This cap has a central aperture 3 to receive the lower portion of a vertically disposed tube 4 which is held in place on the cap by a laterally extending flange 5 of the tube bearing upon the exposed face of the cap and the nut 6 engaging a threaded portion 7 of the tube on the other side of the cap. The upper end of the tube 4 supports a housing 8 which I have shown of annular form and as having a front face 9 and a rear face 10 each of which is covered by a glass disk 12. These faces form dials and are provided with any preferred lettering or other markings to indicate the amount of fluid which has been consumed or the amount which is present in the radiator.

Located between the dials 9 and 10 and having their bearings in such dials are a drum 13 and a shaft 14, the ends of the latter extending beyond the dials and carrying indicating hands 15 and 16 which travel over the markings on the dials. Fixedly secured on the shaft 14 is a gear 17 which is adapted to mesh with a pinion 18 on the spindle 19 of drum 13, the spindle being supported by the two dials before mentioned. A flexible member 20, of cord or other material, is adapted to be wound upon this drum, one end of the flexible member being secured to the drum and the other end passed through the tube 4 and having a float 21 attached at its extremity. The drum 13 is so disposed within the housing 8 that as soon as any portion of the flexible member is unwound from the drum, due to a lowering of the float in the tank, it will be in approximate parallelism with the walls of the tube so that no portion of the flexible member will contact with the tube which contact might cause frictional resistance to the movement of the flexible member. When the float rises within the tank upon the introduction of water, the slack of the flexible member will be taken up by the rotation of the drum 13 under the influence of a spring 22, one end of which is secured to the housing 8 and the other to the drum.

When the radiator is full of water the indicating mechanism will be in the position shown in Figs. 1 and 2 with the float at its highest point. In such position the flexible member is wound upon the drum 13. As soon as the water in the tank falls to a lower level the float will descend communicating such movement to the drum and through the pinion on its spindle to the gear 17 which is mounted on the shaft carrying the indicating hands. As has been before stated, the drum is so mounted within the housing that no portion of the flexible member is in contact with the tube in which the flexible member moves and hence there is no danger of any friction in the movement of the parts.

By providing the indicator with two faces the operator of the machine is quite certain to note the condition of his radiator if not when he enters his garage and faces the front of the machine then most certainly when he enters the car to drive it.

I claim as my invention:

In combination with a tank having an inlet opening and a cap for closing such opening, said cap having a centrally disposed aperture, a device for indicating the level of the fluid in said tank including a vertically disposed tube fitted in the aperture of said cap, a housing at the upper end of said tube, front and rear dials in said housing, a shaft having its bearings in said dials, an indicator hand on each end of said shaft, a gear fixed to said shaft, a drum and a spindle therefor rotatably mounted between said dials; a pinion on said spindle meshing with said gear, a float, a flexible member secured to said float and passing through said tube, the other end of said flexible member being secured to said drum, and a spring connected to said drum for taking up slack in said flexible member as said float is raised.

In testimony whereof I have signed this specification.

WALTER G. CRAMER.